(12) United States Patent
Peirce et al.

(10) Patent No.: US 8,744,421 B2
(45) Date of Patent: Jun. 3, 2014

(54) METHOD OF INITIATING A HANDS-FREE CONFERENCE CALL

(75) Inventors: Kenneth L. Peirce, Grosse Pointe Farms, MI (US); Uma Arun, Novi, MI (US); Sethu K. Madhavan, Erie, PA (US); Ki Hak Yi, Windsor (CA)

(73) Assignee: General Motors LLC, Detroit, MI (US)

( * ) Notice: Subject to any disclaimer, the term of this patent is extended or adjusted under 35 U.S.C. 154(b) by 7 days.

(21) Appl. No.: 13/299,864

(22) Filed: Nov. 18, 2011

(65) Prior Publication Data

US 2013/0130665 A1 May 23, 2013

(51) Int. Cl.
*H04W 4/00* (2009.01)

(52) U.S. Cl.
USPC ........................................ 455/416; 379/88.23

(58) Field of Classification Search
USPC .......... 367/198; 379/45, 202.01; 455/416, 466
See application file for complete search history.

(56) References Cited

U.S. PATENT DOCUMENTS

| 7,983,401 B1* | 7/2011 | Krinsky ...................... 379/88.23 |
| 2003/0231550 A1* | 12/2003 | Macfarlane .................. 367/198 |
| 2009/0168974 A1* | 7/2009 | McCormick ................... 379/45 |
| 2011/0182415 A1* | 7/2011 | Jacobstein et al. ........ 379/202.01 |

* cited by examiner

*Primary Examiner* — Patrick Edouard
*Assistant Examiner* — Myron K Wyche
(74) *Attorney, Agent, or Firm* — Anthony Luke Simon; Reising Ethington P.C.

(57) ABSTRACT

A method of operating a vehicle telematics unit includes storing a conference call access code; initiating a conference call from a vehicle based on verbal commands received from a vehicle occupant; receiving a request for the conference call access code from an automated telephone attendant (ATA) while initiating the conference call; determining that the ATA has requested the conference call access code using a speech recognition function at the vehicle; and sending the stored conference call access code to the ATA based on the determination of the speech recognition function.

20 Claims, 3 Drawing Sheets

METHOD OF INITIATING A HANDS-FREE CONFERENCE CALL

TECHNICAL FIELD

The present invention relates generally to vehicles and more particularly to a method of operating vehicle telematics units that are installed in vehicles.

BACKGROUND OF THE INVENTION

Vehicle manufacturers outfit their vehicles with an increasing number of wireless communications capabilities. Telematics units installed in modern vehicles can wirelessly communicate both voice and data communications between the vehicle and a variety of recipients, such as a central facility or an outside caller. For instance, vehicle telematics units can both place and receive telephone calls at the vehicle. These calls can be initiated using verbal commands provided by a vehicle occupant or through physically-actuated inputs carried by the vehicle and manipulated by the vehicle occupant. Some calls, such as conference calls, can involve a plurality of other callers in addition to the caller located at the vehicle. Participation in conference calls can be conditioned on providing information to the host of those calls, such as the identity of the call using a conference call access code or a particular passcode. For the vehicle occupant, providing this information can be challenging.

SUMMARY OF THE INVENTION

According to an aspect of the invention, there is provided a method of operating a vehicle telematics unit. The steps include storing a conference call access code; initiating a conference call from a vehicle based on verbal commands received from a vehicle occupant; receiving a request for the conference call access code from an automated telephone attendant (ATA) while initiating the conference call; determining that the ATA has requested the conference call access code using a speech recognition function at the vehicle; and sending the stored conference call access code to the ATA based on the determination of the speech recognition function.

According to another aspect of the invention, there is provided a method of operating a vehicle telematics unit. The steps include obtaining a conference call access code from a telematics service user at the vehicle; storing the obtained conference call access code at the vehicle; automatically determining that an automated telephone attendant (ATA) is requesting a conference call access code using speech recognition at the vehicle; generating DTMF tones or DTMF-based commands based on the stored conference call access code; and wirelessly transmitting the DTMF tones or DTMF-based commands to the ATA to establish access to the conference call.

According to yet another aspect of the invention, there is provided a method of operating a vehicle telematics unit. The steps include optimizing a speech recognition function at the vehicle to recognize a group of voices used with one or more automated telephone attendants (ATA); obtaining a conference call access code, a passcode, or both from a telematics service user for establishing a conference call at the vehicle; storing the conference call access code, the passcode, or both at the vehicle; automatically determining that an ATA is requesting a conference call access code using the optimized speech recognition function; generating DTMF tones or DTMF commands based on the stored conference call access code, the passcode, or both in response to the determination; and wirelessly transmitting the DTMF tones or DTMF commands to the ATA to establish access to the conference call.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
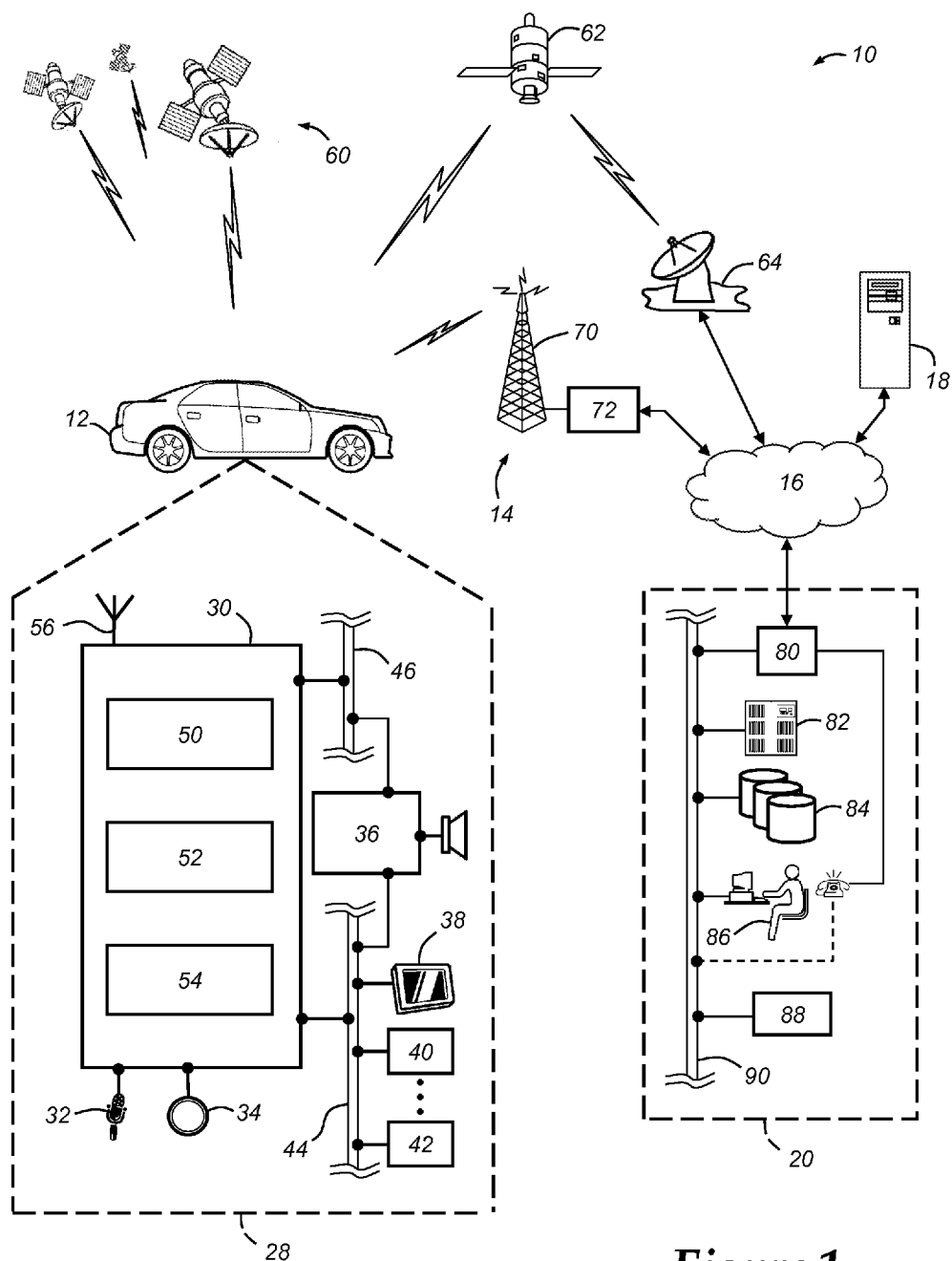
FIG. 1 is a block diagram depicting an exemplary embodiment of a communications system that is capable of utilizing the method disclosed herein.

The method described below interprets voice prompts received at a vehicle from an automatic telephone attendant (ATA) that are used to set up a conference call and automatically responds to those voice prompts by providing the ATA one or more conference call access codes that have been previously provided by a telematics service user. Conference calls can connect multiple callers on a single telephone call. A calling party may wish to have more than one called party listen in and/or participate in on the call. Initiating conference calls can involve calling a telephone number specifically-designated for conference calls and hearing a greeting generated by the ATA. The ATA can then ask for the caller to provide some information, such as a conference call access code, a passcode, or both that would identify the particular conference call the user is attempting to join.

Calls such as these can be established by receiving numbers spoken by the telematics service user at the vehicle. When the user speaks numbers for dialing a phone number, the speech recognition system of the vehicle can recognize those numbers and dial the phone number. In one example, the user can push a button located in the vehicle that informs the system that the user wants to make a call. The system then prepares to receive a telephone number and can usually know ahead of time the number of digits that the user will recite. For example, vehicles that operate in an area serviced by the North American Numbering Plan (NANP) can expect to receive a ten or eleven-digit number. After receiving those digits, the system may then make the determination that the call has been established and it will then stop listening for additional spoken numbers. However, the user may want to respond to a request from the ATA using additional digits, such as the conference call access code that can be used to set up a conference call. In that case, the user would have to somehow alert the system that it should be ready to receive additional digits from the user even though it is not accustomed to doing so. Or the user may have to signal the system that he or she wants to use the keypad to enter additional digits. At the same time, the ATA may be waiting for a response from the user. And considering the amount of time the user could take to prepare the system to receive additional spoken digits, the ATA may determine that the user is non-responsive and end the call while the user is trying to respond.

Instead, it is possible to obtain the conference call access code(s) and/or passcode(s) from the telematics service user before a conference call is placed. These access code(s)/passcode(s) can be saved at the vehicle, such as in a special conference call profile. When the user wants to place a call, the user can rely on the speech recognition function of the vehicle to not only place the call but to also interpret information requests for establishing the call from the ATA by accessing the conference call access code(s)/passcode(s), etc. and sending at least some of that information automatically to the ATA. In doing so, the speech recognition function of the vehicle can be directed to listen to both the user in the vehicle and the incoming requests from the ATA.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
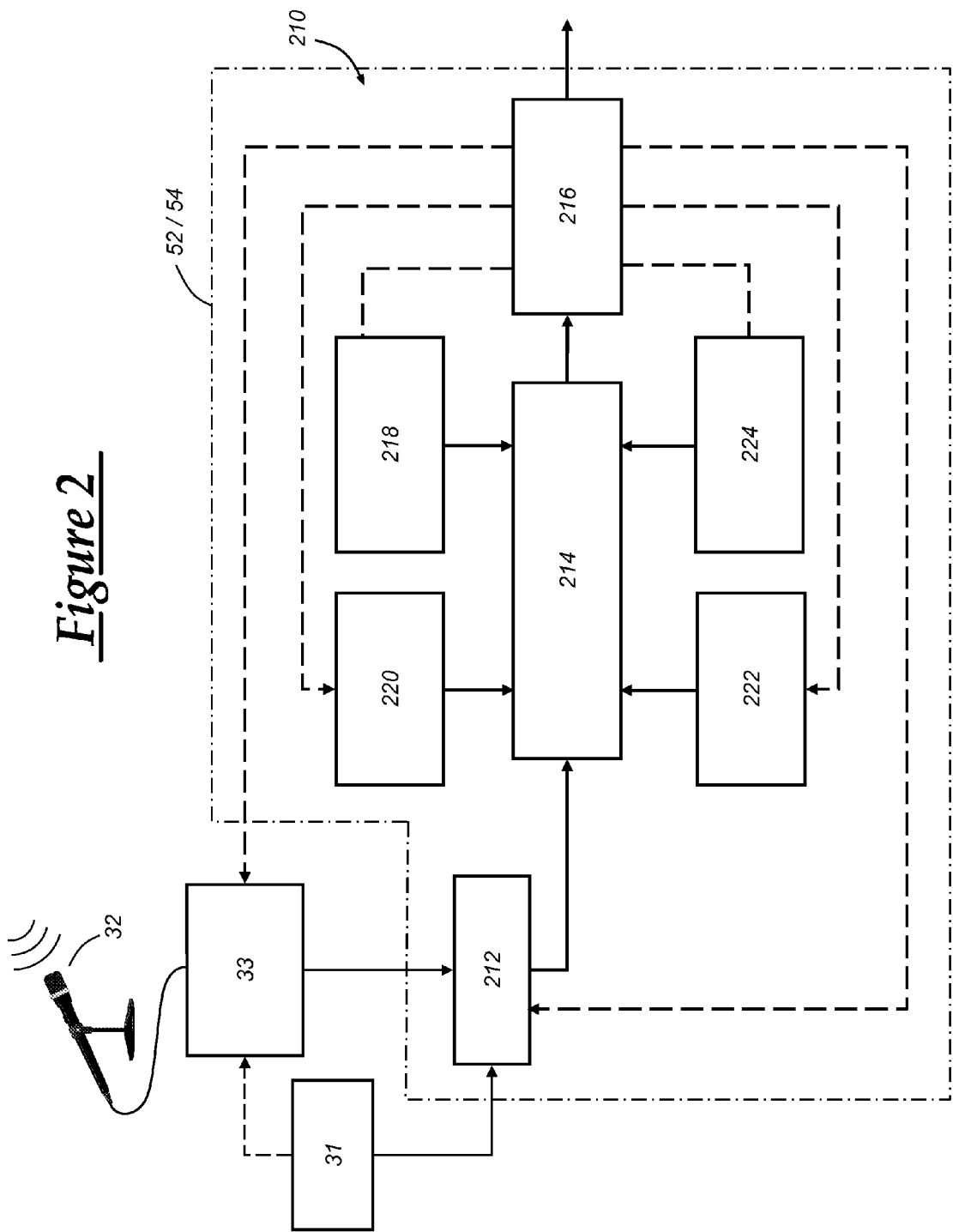
FIG. 2 is a block diagram of an exemplary architecture for an ASR system.

Turning now to FIG. 2, there is shown an exemplary architecture for an ASR system 210 that can be used to enable the presently disclosed method. In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 2 illustrates just one specific exemplary ASR system 210. The system 210 includes a device to receive speech such as the telematics microphone 32, and an acoustic interface 33 such as a sound card of the telematics unit 30 having an analog to digital converter to digitize the speech into acoustic data. The system 210 also includes a memory such as the telematics memory 54 for storing the acoustic data and storing speech recognition software and databases, and a processor such as the electronic processing device 52 to process the acoustic data. The processor functions with the memory and in conjunction with the following modules: one or more front-end processors or pre-processor software modules 212 for parsing streams of the acoustic data of the speech into parametric representations such as acoustic features; one or more decoder software modules 214 for decoding the acoustic features to yield digital subword or word output data corresponding to the input speech utterances; and one or more post-processor software modules 216 for using the output data from the decoder module(s) 214 for any suitable purpose.

The system 210 can also receive speech from any other suitable audio source(s) 31, which can be directly communicated with the pre-processor software module(s) 212 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module(s) 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech. In each of these examples, the relevant model can be trained to learn the voices produced by one or more ATAs. For instance, the identity of the voices used by ATAs may not vary greatly nor would the number of commands. As a result, the grammar or lexicon models 218 can be quickly and easily prepared to identify one of a limited number of known and identified voices used by ATAs and also the likely words and/or commands that ATAs frequently use. As an example, an ATA could ask a caller "please enter your conference call access code." The ASR system 210 can be trained to look for each of these words/phrases and/or the voice likely to speak them.

According to an alternative exemplary embodiment, some or all of the ASR system 210 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 210 can be resident in the telematics unit 30 or distributed across the call center 20 and the vehicle 12 in any desired manner.

First, acoustic data is extracted from human speech wherein a vehicle occupant speaks into the microphone 32, which converts the utterances into electrical signals and communicates such signals to the acoustic interface 33. A sound-responsive element in the microphone 32 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 212 transforms the continuous stream of digital speech data into discrete sequences of acoustic parameters. More specifically, the processor 52 executes the pre-processor module(s) 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module(s) 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 214 to process the incoming feature vectors of each test pattern. The decoder module(s) 214 is also known as a recognition engine or classifier, and uses stored known reference patterns of speech. Like the test patterns, the reference patterns are defined as a concatenation of related acoustic frames and corresponding parameters. The decoder module(s) 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module(s) 216 receives the output data from the decoder module(s) 214 for any suitable purpose. In one example, the post-processor software module(s) 216 can identify or select one of the reference patterns from the N-best list of single or multiple word reference patterns as recognized speech. In another example, the post-processor module(s) 216 can be used to convert acoustic data into text or digits for use with other aspects of the ASR system or other vehicle systems. In a further example, the post-processor module(s) 216 can be used to provide training feedback to the decoder 214 or pre-processor 212. More specifically, the post-processor 216 can be used to train acoustic models for the decoder module(s) 214, or to train adaptation parameters for the pre-processor module(s) 212.

Figure 3:
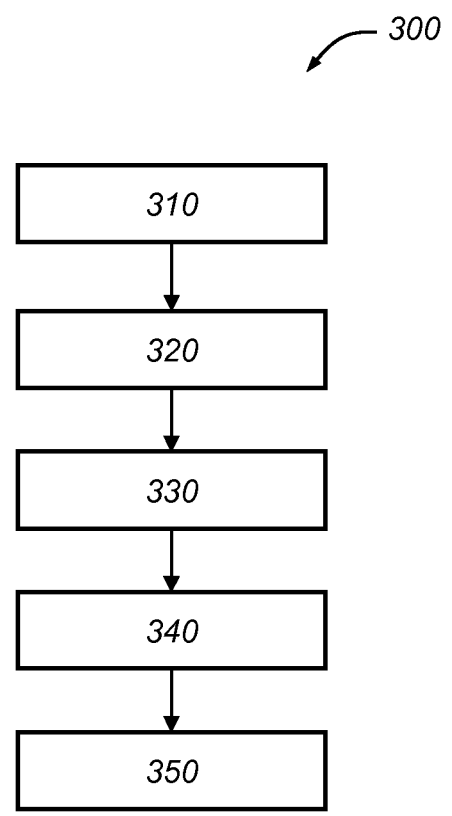
FIG. 3 is a flow chart of a method of operating a vehicle telematics unit.

Turning now to FIG. 3, there is a method 300 of operating a vehicle telematics unit 30. The method 300 begins at step 310 by optimizing a speech recognition function at the vehicle 12 to recognize a group of voices used with one or more automated telephone attendants (ATAs). ATAs, which also can be referred to as interactive voice response (IVR) systems, generally transfer callers to their desired number without the use of human receptionists. That is, callers can interact with computers used by the ATAs via voice output and/or DTMF tones or commands. At least a portion of this can be accomplished by using the ASR system 210 described above. The ASR system 210 can not only receive speech from a vehicle occupant, but can also be directed to receive speech generated by an ATA. In that way, the ASR system 210 can be alternately directed to listening to either the telematics service subscriber/vehicle occupant or the ATA, depending on which source is speaking The term "caller" as used herein can also be read to include "vehicle occupant" or "telematics service user."

Moreover, of the ATAs in use, only a limited number of different voices may be used to generate output from the ATA. Or in other words, there may be only a handful of unique voices that are recorded for use with an ATA. And the number of requests that can be issued by the ATA may be limited as well. For example, the ATA can be expected to recite commands such as "please say the conference call access code" or "please say the passcode." These commands can be reasonably predicted based on the context of the conversation used to set up a conference call. Given the limited number of different voices and/or the limited phrases or commands that the ATA can generate, the ASR system 210 can be programmed (e.g. specifically trained) to anticipate these voices and/or commands as is discussed above. The method 300 proceeds to step 320.

At step 320, a conference call access code, a passcode, or both for establishing a conference call are obtained from a telematics service user and stored. The conference call access code can be a multiple digit code that a caller provides to the ATA when joining a conference call. Similarly, the conference call access code could be used together with the passcode to further identify a caller, such as a vehicle occupant or a telematics service subscriber, among those joining a particular conference call. For instance, the caller could provide the conference call access code to identify a particular conference call and the passcode could be provided as well to indicate the identity of the caller; the caller identity can be associated with additional privileges, such as being designated the host of the conference call. The conference call access code and/or passcode can be stored in a variety of ways and locations. For example, the conference call access code and/or passcode can be recited by the vehicle occupant at the vehicle 12, received by the ASR system 210 via the microphone 32, interpreted by the ASR system 210, and stored in memory at the vehicle 12. In another example, the conference call access code and/or passcode could be saved using a web portal that a user can access via a personal computer. The conference call access code and/or passcode can be saved in a conference call profile which can then be wirelessly sent to the vehicle 12 for on-demand use when the vehicle occupant wants to establish a conference call. The conference call profile can include one or more conference call access codes, passcodes, or telephone numbers that can be used to begin the conference call and/or rules/protocols that can be used with each conference call service provider. The conference call access code and/or passcode can be linked with a spoken nametag, such as a verbal command comprising a word or words, that can be recited by the vehicle occupant when a conference call is desired. The spoken nametag can include one or more telephone numbers that can be used to begin the conference call and can be saved at the vehicle 12. While the method 300 will be described herein in terms of the conference call access code, it should be appreciated that this can also be mean the passcode, or the conference call access code and the passcode, or some other combination of unique information used to identify the caller and/or the conference call the caller is attempting to join. The method 300 proceeds to step 330.

At step 330, a conference call is initiated from a vehicle based on verbal commands received from a vehicle occupant. The vehicle occupant or telematics service user can initiate the conference call by pressing the button 32 and reciting the telephone number servicing the conference call. In another example, the vehicle occupant can recite the spoken nametag, such as a keyword, that is associated with the conference call access code to begin the process of initiating the conference call. The initiation process can be very similar—if not exactly the same—as initiating a regular hands-free call from the vehicle 12. However, unlike placing common telephone calls, the method 300 can include a maintaining the ASR system 210 in a ready state that can automatically generate additional information in order to establish the conference call. The initiation of the conference call can also involve directing the ASR system 210 to begin listening for speech from the ATA. For example, the saved conference call access code can be saved in a profile that includes a computer-readable instruction for initiating the ASR system 210 when the telephone number used for establishing the conference call is called. And when the ASR system 210 is initiated, it can be directed to stop listening to input from the vehicle occupant through the microphone 32 once the conference call has been initiated (e.g. dialed) and to start listening to the input received from an outside caller (e.g. an ATA). Depending the source of audible sound, the ASR system 210 can be directed to alternate listening to the ATA or the caller. The method 300 proceeds to step 340.

At step 340, it is automatically determined that an ATA is requesting a conference call access code using the optimized speech recognition function. This can occur during the conference call initiation process or shortly thereafter. For instance, after the conference call is placed, the ATA can automatically answer the call and generate a prompt to the caller that requests information before establishing a conference call. This prompt can identify the ATA and ask the caller to enter the conference call access code and/or the passcode. The ASR system 210 can be listening for the prompt from the ATA and based on that prompt, access information stored at the vehicle, such as the conference call access code and/or the passcode. The method 300 proceeds to step 350.

At step 350, the stored conference call access code is sent to the ATA based on the determination of the speech recognition function. Once the ATA request is interpreted and the conference call access code/passcode is accessed, the telematics unit 30 can provide the conference call access code/passcode to the ATA. This can include generating DTMF tones or DTMF commands based on the stored conference call access code in response to the determination that the ATA is requesting a conference call access code. The DTMF tones or DTMF commands can be wirelessly transmitted to the ATA for establishing access to the conference call. In another example, the ASR system 210 can generate verbal responses to ATA requests. For instance, if the ATA requests that the caller say the conference call access code, the ASR system 210 can receive the conference call access code/passcode and generate this information audibly for the ATA. The ATA can ask the caller for more than one response. In that case, the ASR system 210 can repeat at least some of the above steps for additional ATA queries. The method 300 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of operating a vehicle telematics unit, comprising the steps of:
   (a) storing a conference call access code obtained from a telematics service user;
   (b) initiating a conference call from a vehicle based on verbal commands received from a vehicle occupant;
   (c) receiving a request for the conference call access code from an automated telephone attendant (ATA) while initiating the conference call;
   (d) determining that the ATA has requested the conference call access code using a speech recognition function at the vehicle; and
   (e) sending the stored conference call access code to the ATA based on the determination of the speech recognition function.

2. The method of claim 1, wherein the speech recognition function is programmed to recognize one or more voices used by the ATA.

3. The method of claim 1, wherein the speech recognition function is programmed to recognize one or more commands generated by the ATA.

4. The method of claim 1, further comprising the step of directing the speech recognition function to alternately listen to the vehicle occupant or the ATA depending on which is speaking.

5. The method of claim 1, wherein step (a) further comprises:
   listening for the vehicle occupant to say the conference call access code in the vehicle;
   interpreting the spoken conference call access code using the speech recognition function at the vehicle; and
   storing the interpreted conference call access code at the vehicle.

6. The method of claim 1, wherein the conference call access code is stored as part of a conference call profile that includes a spoken nametag or at least one rule for interacting with the ATA.

7. The method of claim 1, wherein the initiation of the conference call is determined based on the identity of a phone number dialed by the vehicle occupant.

8. The method of claim 1, wherein the conference call access code is wirelessly sent from the vehicle to the ATA as dual tone multiple frequency (DTMF) tones or DTMF commands.

9. The method of claim 1, wherein the conference call access code is verbally recited to the ATA by the speech recognition function.

10. A method of operating a vehicle telematics unit, comprising the steps of:
    (a) obtaining a conference call access code from a telematics service user at the vehicle;
    (b) storing the obtained conference call access code at the vehicle;
    (c) automatically determining that an automated telephone attendant (ATA) is requesting a conference call access code using speech recognition at the vehicle;
    (d) generating DTMF tones or DTMF-based commands based on the stored conference call access code; and
    (e) wirelessly transmitting the DTMF tones or DTMF-based commands to the ATA to establish access to the conference call.

11. The method of claim 10, wherein the speech recognition at the vehicle is programmed to recognize one or more voices used by the ATA.

12. The method of claim 10, wherein the speech recognition at the vehicle is programmed to recognize one or more commands generated by the ATA.

13. The method of claim 10, wherein the conference call access code is stored as part of a conference call profile that includes a spoken nametag or at least one rule for interacting with the ATA.

14. The method of claim 10, the conference call is initiated based on the identity of a phone number dialed by the telematics service user.

15. The method of claim 10, further comprising the step of determining the ATA is requesting a conference call by directing the speech recognition at the vehicle to alternately listen to the telematics service user or the ATA depending on which is speaking.

16. A method of operating a vehicle telematics unit, comprising the steps of:
    (a) optimizing a speech recognition function at the vehicle to recognize a group of voices used by one or more automated telephone attendants (ATA);
    (b) obtaining a conference call access code, a passcode, or both from a telematics service user for establishing a conference call at the vehicle;

(c) storing the conference call access code, the passcode, or both at the vehicle;
(d) automatically determining that an ATA is requesting a conference call access code using the optimized speech recognition function;
(e) generating DTMF tones or DTMF commands based on the stored conference call access code, passcode, or both in response to the determination in step (d); and
(f) wirelessly transmitting the DTMF tones or DTMF commands to the ATA to establish access to the conference call.

17. The method of claim 16, wherein the speech recognition function is programmed to recognize one or more commands generated by the ATA.

18. The method of claim 16, further comprising the step of directing the speech recognition function to alternately listen to a caller or the ATA depending on which is speaking.

19. The method of claim 16, wherein the conference call access code is stored as part of a conference call profile that includes a spoken nametag or at least one rule for interacting with the ATA.

20. The method of claim 16, wherein the initiation of the conference call is determined based on the identity of a phone number dialed by the telematics service user.

* * * * *